Jan. 9, 1934.  A. L. LEE  1,942,512
TORQUE LIMITING COUPLING
Filed Feb. 16, 1933
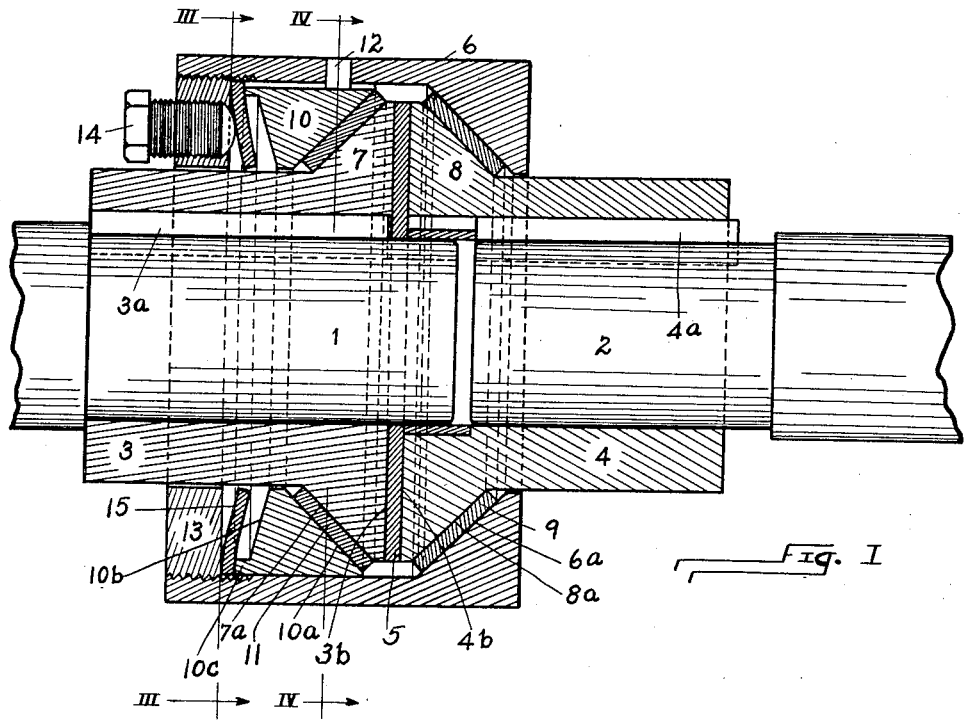
Fig. I
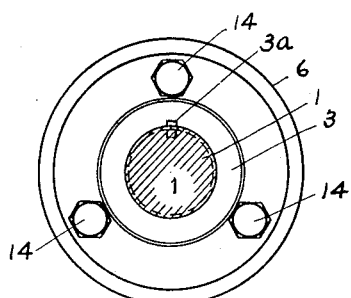
Fig. II
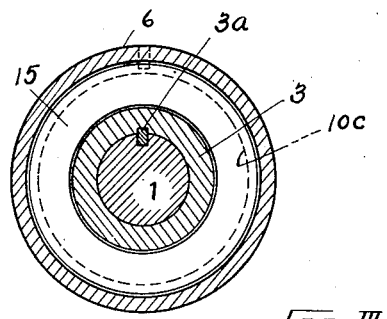
Fig. III
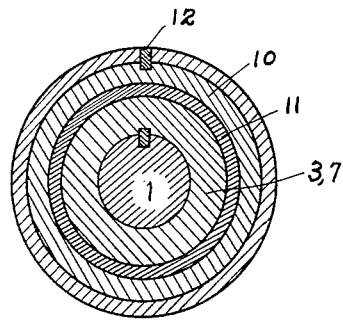
Fig. IV
INVENTOR
Arthur L. Lee
by Christy Christy and Wharton
his attorneys.

Patented Jan. 9, 1934

1,942,512

UNITED STATES PATENT OFFICE 1,942,512

TORQUE LIMITING COUPLING

Arthur L. Lee, Gibsonia, Pa.

Application February 16, 1933. Serial No. 657,086

4 Claims. (Cl. 64—106)

This invention relates to a torque-limiting coupling for the transmission of heavy loads.

In certain heavy duty machinery such as mining machinery, loading machines and the like, the driving shaft of the machine normally transmits a relatively heavy torque which is constant during the normal operation of the machine. It is highly desirable to provide compensation for sudden overloads capable of stalling the machine. For example, injury to a coal mining machine frequently occurs because of the stalling of the machine by sudden contact with a sulphur ball, or other material, through which cutting mechanism associated with the machine cannot be passed. It is important in heavy duty machines of such nature that any torque-limiting coupling employed be capable of sustaining moderate overload, so that normal operation of the machine is not unnecessarily limited. A torque-limiting coupling employed in such machines must also necessarily be compact.

An object of my invention is to provide a torque-limitting coupling, which may be applied conveniently to the operating shaft of heavy duty machinery to transmit heavy loads and moderate overloads, and which is positive in its operation under the influence of a destructive overload.

Further objects of my invention are to provide a torque-limiting coupling which is compact, which maintains the driving and driven elements of an operating shaft in alignment with each other, and in which the normal driving engagement of the coupling is maintained throughout long periods of use with a minimized frequency of adjustment.

In the accompanying drawing Figure I is a central longitudinal section through my torque-limiting coupling and the shaft terminals which it interengages; Figure II is an end elevation of the coupling, viewed from the end at which are mounted the means for exerting pressure to maintain operative engagement of the coupling parts; Figure III is a cross-sectional view taken on the line III—III of Figure I; and Figure IV is a cross-sectional view taken on the line IV—IV of Figure I.

In the accompanying drawing reference numerals 1 and 2 designate aligned but separated elements of the power transmission shaft, and these elements 1 and 2 shall be hereinafter, for purposes of convenience, referred to as individual shafts. Either of the shafts 1 and 2 may be the driving shaft, and either of them may be the driven shaft.

The coupling means for the shafts 1 and 2 comprises primarily sleeves 3 and 4, keyed at 3a and 4a respectively to the shafts 1 and 2. The abutting faces 3b and 4b of the sleeves 3 and 4 bear against opposite sides of a liner disk 5. Sleeves 3 and 4 are held in frictional interengagement by means of a gland 6 which embraces abutments 7 and 8 formed as collars on the sleeves 3 and 4 respectively. The abutment 8 is desirably provided, as shown, with an inclined face 8a, and gland 6 with a similarly inclined face 6a. A liner disk 9 is interposed between these matching faces 8a and 6a. Abutment 7 is likewise desirably provided with the inclined face 7a, matching the inclined face 10a of a keyed filler ring 10. A liner disk 11 is interposed between the matching faces 7a of abutment 7 and 10a of filler ring 10. The filler ring 10 is attached for rotation to gland 6 by means of a key 12. Threaded into the open end of gland 6, adjacent filler ring 10, is a ring 13, which carries a plurality of set screws 14, which are threaded in ring 13 to exert clamping force against the adjacent face of filler ring 10, and which thus serve to maintain the coupling parts in operative frictional engagement.

Because of the fact that gland 6 embraces abutment 8 and sleeve 4, the reaction to the clamping force exerted by set screws 14 produces an equal pressure for frictional contact on faces 6a and 8a and faces 7a and 10a. Equal forces also act in opposite longitudinal directions to maintain faces 3b and 4b in frictional contact.

It will be readily understood that the opposed and aligned cones provided by abutment collars 7 and 8, serve, under the influence of forces acting on their inclined outer faces, to maintain the alignment of the entire coupling structure and the alignment of the coupled shafts.

In order to avoid frequent adjustment of set-screws 14 because of any slight wearing of the liners in the coupling, resilient means are provided for transmitting the force exerted by set screws 14 to filler ring 10. It is necessary that such resilient means be capable of transmitting a heavy load without becoming so compressed as to lose resiliency. For this purpose I employ a disk form annulus 15 of relatively high gauge resilient metal. This disk form annulus is free in the annular space between sleeve 3 and gland 6, in an annular chamber defined by filler ring 10 and locking ring 13.

Desirably, as shown, the outer face 10b of the filler ring 10 is inclined toward the sleeve 3, and is provided with an annular foot 10c, adjacent gland 6, against which the inner face of resilient disk 15 lies. Under the influence of set screws 14 the resilient disk 15 is dished, as shown in Figure I of the drawing. This dishing of resilient disk 15 serves to distribute the pressure exerted on filler ring 10 by set screws 14 through a longitudinal distance which is sufficient to compensate for a relatively great amount of wear in the liner disks 5, 9, and 11 without advancement of set screws 14.

It is to be understood that the deformation of disk ring 15 is bodily, rather than local, in the region of the set screws 14, so that it assumes the form of a cone of relatively slight angle. The deformation is substantially uniform throughout the entire circle of the ring. I have found a two or three point bearing of set screws on the ring sufficient to give this substantially uniform deformation, although additional set screws may, if desired, be provided.

It should be emphasized that this form of spring is capable of transmitting heavy forces, and is thus of importance in the combination by which the coupling is capable of transmitting heavy loads.

In the coupling, as adjusted for power transmission, the frictional engagement of the coupling parts is sufficient to sustain heavy torques transmitted in normal operation of a machine, and may be set to slip only upon the occurrence of such overload as may be dangerous to the machine. The coupling is compact, so that it may be applied to machinery in which the incorporation of a clutch having extended contact areas would be impossible. It may further be noted that the driving forces are directed longitudinally of the shafts 1 and 2, and are not transmitted by means of friction surfaces disposed concentrically to the axis of the shafts. The coupling tends to maintain the shafts 1 and 2 in alignment with each other, rather than to disturb the shaft alignment. The resilient means for transmitting the clamping force of the coupling is compact and capable of transmitting heavy loads. These qualities of the resilient means for transmitting the coupling force permit the compact coupling, as a whole, to transmit heavy loads throughout a relatively extended period of time without readjustment.

While my coupling is particularly valuable for use in heavy duty machinery, because of its compactness, it should be understood that it may be used to connect the aligned elements of a power transmission shaft mounted to transmit power for any other purpose.

I claim as my invention:

1. In a torque-limiting coupling for the interconnection of driving and driven shafts, the combination of friction members on and rotatable with the driving and driven shafts respectively, a resilient disk form annulus of uniform contour operatively mounted to transmit force for holding said friction members in frictional contact, a pressure-transmitting member having a common mounting for rotation with the resilient annulus and presenting to the resilient annulus an inclined face providing space for bodily distortion of the resilient annulus, and pressure means arranged to bear against said resilient annulus to distort the annulus and thereby cause it to exert upon the said friction members a force tending to hold them in frictional contact.

2. In a torque-limiting coupling for the interconnection of driving and driven shafts, the combination of intercontacting friction sleeves mounted on said shafts to rotate therewith and to be brought into frictional contact with each other, and a clamping assembly comprising adjustable pressure means arranged to hold said sleeves in frictional contact, and a resilient disk form annulus arranged to be distorted by the clamping force exerted by said adjustable pressure means yieldingly to distribute the force exerted by said clamping means, a pressure-transmitting member arranged to cooperate in confining the resilient annulus, and mounting for said pressure-transmitting member arranged to hold said member against differential rotation with respect to the resilient annulus.

3. In a torque-limiting coupling for the interconnection of aligned driving and driven shafts, the combination of annuluar friction members on and rotatable with the driving and driven shafts respectively, said friction members having abutting contact faces and outer contact faces, with a clamping assembly comprising a tubular housing arranged to surround and embrace said friction members, pressure means carried by said housing and arranged to exert a force for holding said friction members in contact, a resilient disk form annulus of uniform contour arranged to be distorted by the pressure means yieldingly to distribute the force exerted by said clamping means, and an annular pressure-transmitting member slidably mounted in the housing to rotate therewith and arranged to transmit to the friction members clamping pressure originated by the pressure means and distributed by the resilient annulus, said pressure-transmitting member presenting to the resilient annulus an inclined face providing space for bodily distortion of the resilient annulus.

4. In a torque-limiting coupling for the interconnection of aligned driving and driven shafts, the combination of annular friction members on and rotatable with the driving and driven shafts respectively, said friction members having abutting contact faces and outer contact faces, with a clamping assembly comprising a tubular housing arranged to surround and embrace said friction members, pressure means carried by said housing and arranged to exert a force for holding said friction members in contact, a resilient disk form annulus arranged to be distorted by the pressure means yieldingly to distribute the force exerted by said clamping means, and an annulus pressure-transmitting member slidably mounted in the housing to rotate therewith and arranged to transmit to the friction members clamping pressure originated by the pressure means and distributed by the resilient annulus.

ARTHUR L. LEE.